United States Patent Office 3,099,566
Patented July 30, 1963

3,099,566
PROCESS FOR PICKLING MEAT AND PICKLING PREPARATION THEREFOR
Peter Flesch, Mainz-Gonsenheim, and Josef Hader, Koblenz-Lutzel, Germany, assignors to Rhenus Rheinische Getränke-Industrie Bienz & Bienz G.m.b.H., Koblenz-Lutzel, Germany
No Drawing. Filed June 14, 1960, Ser. No. 35,891
Claims priority, application Germany June 23, 1959
9 Claims. (Cl. 99—159)

The present invention relates to a process for pickling and flavoring meat and food preparations made from meat; more particularly, the invention concerns a method in which an improvement of the red color of the meat and the preparations made therefrom is intended while reducing the necessary amount of sodium nitrite to a minimum.

Pickling of meat is effected, as well known, by treatment with a mixture of common salt (Nacl) with the addition of at least 0.5% and at the most 0.6% of sodium nitrite. The addition of the nitrite serves the purpose of turning the color to a more vivid red. By the action of acids and bacteria, the nitrite will form nitrogen oxide, which will react with myoglobin or myochromogen contained in the meat with the formation of nitroso myoglobin or nitroso myochromogen, respectively, thus preventing the meat from turning grey.

However, the reddening which can be accomplished with the acceptable amounts of nitrite will only last a comparatively short time. And it would be desirable to reduce even this amount of nitrite for reasons of physiological side reactions.

Many attempts have therefore been made in recent years to find an effective pickling agent with a low nitrite content, which would yet cause a satisfactory reddening of the meat. Various pickling adjuvants, such as nicotinic acid, citric acid, lactic acid, phosphoric acid and hydrochloric acid have been suggested for the successful treatment of the meat.

However, none of these agents were accepted in the practice of pickling, since the reddening accomplished with their aid was not sufficiently marked. No substantial reductions of the nitrite contents were possible, either.

It is, therefore, an object of the present invention to provide a pickling process which makes it possible to produce pickled meat and meat preparations of a pleasant red color which will not change during cold storage.

It is a further object of the invention to provide a pickling process in which a smaller amount of sodium nitrite can be used while the pickling effect is undiminished.

It is yet another object to make pickled meat and meat preparations of an improved flavor.

It is another object of the invention to provide a pickling agent for carrying through the above described process.

Other objects and advantages of the invention will be described hereinbelow.

The invention is based on the surprising discovery that a really lasting color effect and an improvement in taste could be effected in the pickling of meat and preparations made therefrom by treatment with nitrite-containing salt, when during the pickling procedure sorbic acid or sorbate ions are present. The invention therefore provides the presence of sorbic acid or sorbate for carrying out the pickling process.

It has been found that it is also advantageous to add ascorbic acid which has already been used in pickling methods before, usually in quantities ranging from 0.08 to 0.5%. For adjusting a favorable pH value, sodium citrate (usually 0.1 to 2%) is used, which can be replaced more or less by sodium succinate (usually 0.1 to 2%). For improving the flavor, such agents as cane sugar, paprika, juniper, chilli, marjoram or the like may likewise be added.

The process according to the invention can be carried out in the simplest manner by using as a pickling agent a salt containing in addition to the conventional ingredients, namely common salt and sodium nitrite, and, if desired, ascorbic acid, either sorbic acid or sodium sorbate, furthermore, sodium citrate or succinate, and the flavoring agents mentioned above. With a pickling agent thus composed the following advantages may be achieved.

(A) Good keeping properties and lasting coloring of the pickled goods: Sorbic acid not only inhibits growth of fungi and yeasts, but probably also causes inactivation of meat enzymes, which can be proved by the keeping quality of the meat determinable by color and flavor.

(B) Improved and accelerated reddening: The use of sorbic acid permits the reduction of the added amount of nitrite from the maximum 0.6% permitted by law down to 0.12%, i.e., to one fifth. By adding sodium citrate, which may be replaced partly or completely by sodium succinate, a pH value of about 5 is adjusted in the liquor, which proved to be especially satisfactory for the reddening effect.

(C) Since sorbic acid is at least partly destroyed by boiling, the preparation of such goods as boiled ham or other boiled meat is carried out by first boiling the goods and allowing them to remain in the brew with the sorbic acid for some time at a slightly reduced temperature, of about 80° C., and then letting the temperature drop gradually to room temperature. The concentration of sorbic acid in the cooling brew may preferably range from 0.01 to 0.12% by weight, and, if necessary, some amount of the acid may be added at this stage. The sorbic acid or alkali sorbate content may amount to as much as 0.8% calculated as sorbic acid referring to the total weight of the pickling salt mixture.

(D) By the addition of such flavoring agents as cane sugar, paprika, juniper, chilli, and marjoram, the taste and the sales value of the treated meat preparations are considerably enhanced.

(E) Reduced loss of weight in boiled meats: the loss of weight always encountered by the boiling process of meat is brought down to a minimum when the goods are treated as described. The loss will not exceed 1.5 to 3%.

In the following, the process according to the invention will be more fully described in a number of examples but it should be understood that these are given by way of illustration and not of limitation and that many changes in the details may be made without departing from the spirit of the invention. The percentage figures indicate weight percent.

Example 1

For preparing 10 liters pickling liquid we used:

|  |  | Percent |
|---|---|---|
| 2000 g. | NaCl | 79.55 |
| 500 g. | cane sugar | 19.89 |
| 3 g. | paprika | .12 |
| 3 g. | Juniper berries | .12 |
| 2 g. | ascorbic acid | .08 |
| 3 g. | sorbic acid | .12 |
| 3 g. | NaNO₂ | .12 |
| 2514 g. total; balance water |  | 100.00 |

Two hams of a total weight of 6.230 kilograms were injected thoroughly with about 2 liters of the above described preparation and then pickled with another 6 liters of the preparation for 48 hours at temperatures ranging from −2° to +2° C. The cooking time was 30 minutes at 100° C. and 3 hours at 80° C. The hams remained in the brew until they had cooled down completely. Weight of the finished hams 6.050 kilograms. Loss of weight 180 grams, or 2.8%. Color and flavor of the treated hams was very good.

Example 2

For preparing 10 liters pickling liquid we used:

|  |  | Percent |
|---|---|---|
| 2000 g. | NaCl | 78.74 |
| 500 g. | cane sugar | 19.68 |
| 3 g. | Juniper | .12 |
| 2 g. | chilli | .08 |
| 3 g. | paprika | .12 |
| 2 g. | marjoram | .08 |
| 3 g. | sorbic acid | .12 |
| 3 g. | NaNO₂ | .12 |
| 18 g. | Na-citrate | .705 |
| 6 g. | Na-succinate | .235 |
| 2540 g. total; balance water |  | 100.00 |

With 2 liters of the so prepared liquor, two hams of a total weight of 6.305 kilograms were injected and then 6 liters of liquor were added. The pickling time was 48 hours at −2° to −4° C. The hams were then taken out, rolled and boiled in water for 30 minutes at 100° C. and then for 3 hours at 80° C. with addition of 3 grams of sorbic acid.

After having cooled down completely in the brew, the weight of the hams was 6.180 kilograms, the loss of weight was 125 grams, i.e., 2.02%. When stored for as long as 72 hours in the cold, no discoloration was observed.

Example 3

For preparing 10 liters pickling liquor we used:

|  |  | Percent |
|---|---|---|
| 2000 g. | NaCl | 78.8 |
| 500 g. | cane sugar | 19.7 |
| 3 g. | paprika | .12 |
| 3 g. | Juniper berries | .12 |
| 3 g. | sorbic acid | .12 |
| 3 g. | NaNO₂ | .12 |
| 2 g. | ascorbic acid | .08 |
| 24 g. | Na-citrate | .94 |
| 2538 g. total; balance water |  | 100.00 |

Two hams with a total weight of 6.075 kilograms were treated; for injection, 1.5 liters of the prepared pickling liquor were used. After injection, the hams weighed 7.000 kilograms. Then, the pickling was effected with 6 more liters of the prepared liquor (ratio meat:liquor about 1:1) at a temperature of −2° to −4° C. Pickling time was 48 hours. The hams were then boiled for 30 minutes at 100° C. and were kept at 70°–75° C. for 3 hours. After cooling down to room temperature, the total weight of the hams was 5.970 kilograms, loss of weight 105 grams or 1.73%.

The treated hams had a pleasant pink color of natural appearance and were of excellent flavor. Even after 72 hours storage at low temperature there was no discoloration noticeable.

Example 4

For preparing 10 liters of pickling liquor we used:

|  |  | Percent |
|---|---|---|
| 2000 g. | NaCl | 78.74 |
| 500 g. | cane sugar | 19.68 |
| 3 g. | paprika | .12 |
| 3 g. | Juniper berries | .12 |
| 2 g. | chilli | .12 |
| 3 g. | NaNO₂ | .12 |
| 2 g. | ascorbic acid | .08 |
| 12 g. | Na-citrate | .47 |
| 12 g. | Na-succinate | .47 |
| 2540 g. total; balance water |  | 100.00 |

Two hams of a total weight of 5.885 kilograms were pickled. After having thoroughly injected 1.5 liters of pickling liquor, 6 liters of liquor were added and pickling was carried out for 48 hours at −2° to +2° C. After a boiling time of 30 minutes at 100° C., the hams were treated for 3 hours at 80° C. with the addition of 2 grams sorbic acid. Total weight of the finished hams was 5.73 kilograms. Weight loss 155 grams, thus 2.63%. The hams were of natural pink color, which did not change after 72 hours storage in a cool place.

Example 5

For preparing 10 liters pickling liquor we used:

|  |  | Percent |
|---|---|---|
| 2000 g. | NaCl | 78.74 |
| 500 g. | cane sugar | 19.68 |
| 3 g. | paprika | .12 |
| 3 g. | Juniper berries | .12 |
| 2 g. | marjoram | .08 |
| 3 g. | sorbic acid | .12 |
| 3 g. | NaNO₂ | .12 |
| 2 g. | ascorbic acid | .08 |
| 18 g. | Na-citrate | .705 |
| 6 g. | Na-succinate | .235 |
| 2540 g. total; balance water |  | 100.00 |

Two hams were pickled having a total weight of 8.050 kilograms. After careful injection of 2.5 liters of the pickling liquor, the hams were placed into 6 liters of the liquor and pickled for 48 hours at −2° to +2° C. They were then rolled and boiled for 30 minutes in water at 100° C.; this was followed by a treatment at 80° C. for 3 hours with addition of 3 grams of sorbic acid. Color and taste of the treated hams were excellent. Weight loss amounted to 165 grams or 2.04%.

While we have described the treatment of hams, it should be understood that other meats, e.g., tongue, sausages and the like may undergo the same pickling treatment with equally excellent results.

Also, it should be understood that the pickling treatment with an equivalent amount of sodium sorbate can very well be used instead of that with sorbic acid, the results as to the color and taste of the pickled goods being just as satisfactory.

What is claimed is:

1. A process for pickling meat and meat preparations which comprises adding sodium nitrite to a pickling liquor containing common salt, the concentration of said sodium nitrite being within the physiologically and legally admissable limits, adding a second compound selected from the group consisting of sorbic acid and alkali metal sorbates, the quantity of said second compound being 0.01 to 0.8% calculated as sorbic acid and referring to the total weight of the pickling salt mixture.

2. A process according to claim 1 wherein ascorbic acid is further added to the pickling liquor in a concentration ranging substantially from 0.08 to 0.5%.

3. A process according to claim 1 wherein sodium citrate is further added to the pickling liquor in a concentration ranging substantially from 0.1 to 2%, for adjusting the pH value of the solution.

4. A process according to claim 1 wherein sodium succinate is further added to the pickling liquor in a concentration ranging substantially from 0.1 to 2%, for adjusting the pH value of the solution.

5. A process according to claim 1 wherein the content of said sodium nitrite is between 0.12 and 0.6% by weight of the sodium chloride content of said pickling solution.

6. A process according to claim 1 wherein flavoring means is added to said pickling liquor in a quantity suitable for human consumption.

7. A process according to claim 6 wherein said flavoring means comprises any of the agents selected from the group consisting of sugar, paprika, juniper berries, chili and marjoram.

8. A process for treatment of meat and meat preparations which were subjected to pickling and subsequently to cooking, which comprises letting the cooking brew cool to approximately 80° C., adding 0.01 to 0.8% sorbic acid and allowing said meat or meat preparation to stand in said brew until it cools to substantially normal temperature.

9. A pickling salt containing in addition to sodium chloride as main ingredient, and sodium nitrite in the amount of 0.1% to 0.2% calculated on sodium chloride, a substance selected from the group consisting of sorbic acid and sodium sorbate in the amount of 0.1% to 0.8% by weight and a substance selected from the group consisting of sodium citrate and sodium succinate in the amount of 0.1% to 2% by weight, the percentages being calculated on the amount of sodium chloride.

References Cited in the file of this patent

UNITED STATES PATENTS

| | | |
|---|---|---|
| 2,117,478 | Hall | May 17, 1938 |
| 2,355,548 | Musher | Aug. 8, 1944 |
| 2,860,995 | Sair | Nov. 18, 1958 |
| 2,865,764 | Gorsica et al. | Dec. 23, 1958 |
| 2,875,068 | Klein | Feb. 24, 1959 |
| 2,933,399 | Nickerson et al. | Apr. 19, 1960 |